United States Patent Office 2,938,795
Patented May 31, 1960

2,938,795

BEER AND ALE AND METHOD OF PREPARING THE SAME

George H. Kinsman, Wauwatosa, and Nison N. Hellman and Dwight L. Baker, Milwaukee, Wis., assignors to Basic Products Corporation, Milwaukee, Wis., a corporation of Wisconsin No Drawing. Filed July 2, 1959, Ser. No. 824,475

5 Claims. (Cl. 99—48)

The present invention relates to the preparation of malt liquors and more particularly to the preparation of beer and ale.

In the manufacture and packaging of beers and ales there has long been the problem of oxidation reactions which are believed to take place in the beverage both before and after packing. These reactions materially affect the taste, color and other properties of the beverage, and as a result substantially affect consumer acceptance of the product.

The containers in which beer and ale beverages are packaged are ordinarily not filled to capacity and in such containers the headspace remaining above the liquid level generally contains air and carbon dioxide gas, the proportion of air depending upon the method and manner of filling. In addition, there is ordinarily a considerable amount of air dissolved in the beverage, most of which is taken into solution during production and packaging of the product. This air in the beverage and in the headspace of the containers is a source of oxygen which is believed to chemically combine with certain ingredients of the beverage to produce a deterioration of flavor, taste, coloring and, in general, affect the acceptability of the product. The extent of the deterioration is believed to depend upon a number of factors including time, temperature, exposure to light and the presence of certain ingredients in the liquid.

Various stabilizers for beer and like malt liquors have been suggested. For example, the use of ascorbic acid and its related compounds have been suggested in U.S. Patent 2,159,985. In our copending application Serial No. 735,390, filed May 15, 1958, we have described and claimed the use of 2,4,5-trihydroxybutyrophenone (THB) as a stabilizer for malt liquors.

It is the primary object of the present invention to provide an improved stabilizer for malt liquors and particularly for beer and ale. More particularly, it is an object of the present invention to provide a stabilizer for malt liquors which may be used in extremely small amounts with highly effective results.

Another object of the present invention is to provide a stabilizer of the foregoing character which is both effective in preventing the oxidation of any natural constituents of the liquor and which is stable before use, in transit, and during storage. Still another object is to provide a stabilizer which may be used only in very small amounts and which does not impart off-tastes of flavors to the product.

A further object of the present invention is to provide a stabilizer which is easily and simply used and does not require complicated procedures or processes for its addition to the beverages.

A more specific object of the invention is to provide an improved stabilizer for beer, ale and like malt liquors comprising the substance adenine, which is the compound 6 amino purine. More particularly, it is an object of this invention to provide an improved method of stabilizing beers and ales and other malt liquors against oxidation comprising the addition thereto of adenine, whereby original flavor, taste, appearance and other desirable characteristics of the beverage are maintained for longer periods of time than heretofore obtainable with known stabilizers and antioxidants even though substantial amounts of air or other sources of chemically combinable oxygen are present in the containers or in the beverages.

For convenience in the following description of the invention reference will be made to beer alone. It should be understood, however, that the description applies equally to ales and other malt liquors.

In accordance with the present invention, for the purpose of stabilizing beer against oxidation without substantially affecting the taste, color and other desirable characteristics of the beverage, there is added to the beer at any suitable stage in its production, for example before packaging, a small amount of the compound adenine. The actual amount of the stabilizing compound adenine which is added depends upon a number of factors, including the amount of air in the headspace in the package, the amount of air entrapped, occluded, or dissolved during production of the beer, the previous treatment or packaging of the beverage, and variations in the beer itself. For instance, beer contains a number of natural scavengers and natural antioxidants which are not sufficient in themselves for protection of the beer against oxidation. The presence of these natural substances, however, will influence the amount of antioxidant and stabilizing material that may be needed or be added.

To illustrate the effectiveness of adenine in stabilizing beer, accelerated oxidation tests were made on freshly purchased commercial samples of beer. The oxidation test is a standard 14 day test, and the results may be extrapolated over the expected shelf life of the product to indicate effectiveness of the protection offered by adenine additions against oxidation and the production of off-tastes and other undesirable characteristics in the beer. The taste test involved selecting a number of samples of beer. Some of the samples were used as a standard untreated control designated "C"; other samples were treated by a displacement technique to replace the headspace carbon dioxide with air. The technique used for replacing headspace $CO_2$ with air consisted of opening the bottle of cooled beer (at 30° F.) and displacing the $CO_2$ or gas in the headspace by inserting a glass test tube or rod having a diameter slightly less than the neck of the bottle, so that the liquid reaches the top of the beer bottle but does not overflow. Precautions were taken to prevent foam from filling the headspace. All of the equipment used was sterilized with ethanol to insure that no bacteria were added.

Some of the displaced samples were used as the control oxidized beer and were labelled "$C_{ox}$." The remaining samples were treated with selected amounts of adenine at the levels indicated in Table I. The adenine was added from a stock solution containing 20 milligrams per liter. After recapping, the samples were shaken vigorously and stored at room temperature. The shaking operation was repeated for about one-half minute per sample, once each day for fourteen days.

After the days had passed, all of the samples were taste tested by a panel consisting of eight members trained to distinguish oxidized flavor in beer. They were instructed to score the samples on a basis of 1 to 10, with a fresh, relatively unoxidized beer having a score close to 1, and a beer which was oxidized in flavor being given a score closer to 10. The scores obtained by the different samples were averaged to give the average taste test scores which are presented in Table I.

TABLE I

*Taste test evaluation of adenine as a stabilizer for beer*

| Treatment | | Average Taste Test Score (1-10 Basis) |
|---|---|---|
| Adenine Added, p.p.m. | Displacement of Headspace $CO_2$ | |
| (C Control, Fresh) | Not Displaced | 1.86 |
| ($C_{ox}$ Control, Oxidized) | Displaced with Air | 6.07 |
| 0.25 | do | 4.67 |
| 0.50 | do | 4.57 |
| 1.25 | do | 4.10 |
| 2.50 | do | 5.50 |
| 7.50 | do | 4.13 |
| 12.5 | do | 4.88 |
| 15.0 | do | 4.14 |
| 25.0 | do | 4.50 |
| 50.0 | do | 4.00 |

Comparing the average score for the undisplaced beer (sample C) with that obtained by the displaced sample (sample $C_{ox}$), it can be seen that the displaced sample is definitely oxidized in flavor. Additions of adenine, however, protect the taste or flavor of the beverage.

With respect to the lower limit of the use of adenine as a flavor stabilizer, it can be observed from Table I that as little as 0.25 part per million (about 0.25 milligram per liter) was effective in stabilizing the flavor of the beer. Further tests indicate that the lower limit of effectiveness is below that amount, and is probably as low as about 0.10 part per million.

The preferred concentration range for the use of adenine appears to have no upper limit up to 50 parts per million, the highest concentration used in these tests. This upper limit is believed to be of minor significance in as much as the use of excess adenine would be relatively expensive. However, even in the larger amounts the adenine does not impart an adverse taste to the beer. Since adenine itself is a naturally occurring material and is suitable for use in foods, it is believed that there is no upper toxic limit for its use. Also, since the adenine itself has no strongly recognizable flavor, there is no upper limit to its use with respect to flavor.

The table of taste test results indicate that adenine possesses marked flavor stabilizer potential for aqueous suspended food substances such as malt liquors, even at very low concentrations. We have found that for malt beverages the effective and preferred concentration of adenine is small and is about 0.5 part per million. As pointed out above, the tests were made by accelerating the oxidation of the samples. However, the results may be extrapolated with accuracy over an expected shelf life of the product.

The actual amount of additive required appears to vary slightly in accordance with the techniques of manufacture and production of constituents inherent of each brewery. The maximum amount would also be governed by the relative cost and by any toxicity standards which may be established by the U.S. Food and Drug Administration.

In carrying out the invention, the adenine is added in such quantities that the stabilization characteristics of the beverage are retained over a normal storage period. While the amount of adenine to be added will therefore depend to some extent on the air present in the package, practically this factor is secondary to the time factor and, in fact, even a small amount of adenine is sufficient for a wide range of storage conditions and oxygen content. It has not been possible to test other purines such as guanine, xanthine, and uric acid which are related in structure to adenine in order to determine their utility as stabilizers of malt beverages. It is not unlikely, however, that certain of these may have effectiveness for this purpose. Obviously, if one skilled in the art after reading the specification were to test such compounds or related compounds and find them suitable for this purpose, the use of such equivalent material would be within the spirit and scope of the invention as expressed in the appended claims.

We claim as our invention:

1. In the method of producing beers and ales a step which consists of adding thereto the compound adenine.

2. The method of producing beers and ales comprising the step of adding thereto adenine.

3. A malt liquor such as beer and ale characterized by the presence therein of adenine in an amount sufficient to effect substantial stabilization thereof against oxidation without substantially affecting the wholesomeness, flavor, appearance and other desirable characteristics of the beverage.

4. Malt liquor such as beer and ale characterized by the presence therein of adenine in an amount of at least about 7.5 parts per million and having an upper limit determined by the wholesomeness, flavor and appearance of said beer, ale and malt liquor.

5. Malt liquor such as beer and ale characterized by the presence therein of adenine in an amount of at least about 0.10 part per million.

No references cited.